S. W. FOWLER.

Lamp-Burners.

No. 5,946. Reissued June 30, 1874.

Witnesses,

Chas. H. Smith

Geo. D. Pinckney

Inventor

Samuel W. Fowler.

for Lemuel W. Serrell atty

AM. PHOTO-LITHOGRAPHIC Co. N.Y. (OSBORNE'S PROCESS.)

UNITED STATES PATENT OFFICE.

SAMUEL W. FOWLER, OF BROOKLYN, NEW YORK, ASSIGNOR, BY MESNE ASSIGNMENTS, TO THE PLUME AND ATWOOD MANUFACTURING COMPANY, OF WATERBURY, CONNECTICUT.

IMPROVEMENT IN LAMP-BURNERS.

Specification forming part of Letters Patent No. 116,292, June 27, 1871; reissue No. 5,946, dated June 30, 1874; application filed April 25, 1874.

*To all whom it may concern:*

Be it known that I, SAMUEL W. FOWLER, of Brooklyn, in the county of Kings and State of New York, have invented an Improvement in Lamp-Burners; and the following is declared to be a specification of the same.

My invention relates to that class of burners in which there is an elevated air-distributer near the upper end of the wick-tube, and a surrounding flange or plate extending to the inside of the chimney, or nearly so, and a chimney-holder some distance below such flange.

My improvements are made for facilitating lighting and cleaning by the use of a cone hinged to the portion of the burner around the elevated air-distributer, and for facilitating the filling of the lamp by a tube below the removable air-distributer, and above an open burner body, the space between such tube and body being covered with perforated plates that regulate the admission of air to the burner.

Figure 1:
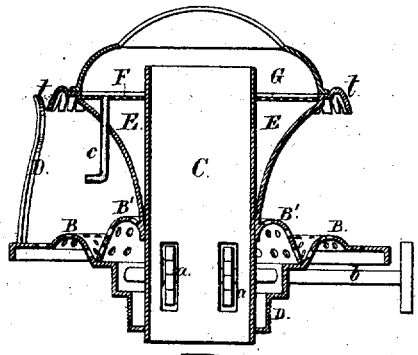
Figure 2:
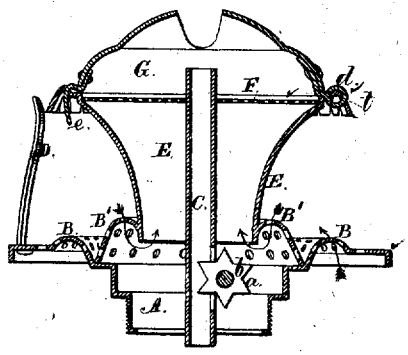
Figure 3:
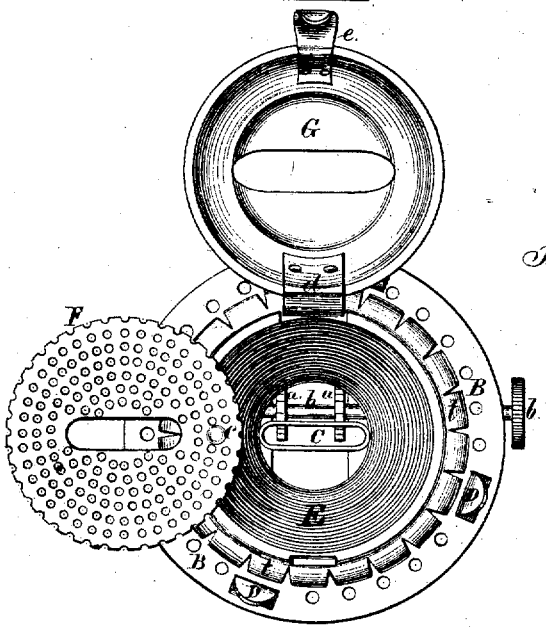

In the drawing, Figure 1 is a vertical section of a lamp-burner having my improvements applied thereto. Fig. 2 is a transverse vertical section of the same at right angles to Fig. 1. Fig. 3 is a plan view of the burner, showing the parts in position for replenishing the lamp with oil.

A designates the body of the burner, and B the perforated base-plate, the latter being provided with a screw for screwing into the collar of the lamp in the usual way, and also with a wick-tube, C, and wick-raiser *a a*, and shaft *b* of the usual construction. I preferably stamp the perforated base-plate B and body A out of one piece of metal. D D are springs, projecting upward from the base-plate B, for holding the chimney. I preferably attach these springs D to the base-plate a short distance from the rim thereof, so as to leave a portion of the base-plate outside the springs on which to rest a globe ring, thereby adapting the burner for receiving a globe whenever it is desired to use the same. E designates the filler-tube, which is of cylindrical or other proper form, and is sufficiently large to surround the wick-tube. I preferably adopt a conical form, and provide the tube with a flaring upper end or mouth carrying a flange, *t*, which is turned over and outward, so as to leave only the desirable space between it and the chimney for permitting air to ascend to the flame above the cone, and the edge of the flange *t* may be slitted, if desired; and, indeed, the flange may extend outward sufficiently far to hold the chimney by inside pressure alone, as in the Collins burner, and thereby permitting the arms D to be dispensed with.

In the example shown, the lower end of this filler-tube E is secured to a perforated intermediate plate, B′, which latter plate extends from the base-plate B to the tube E, the lower end of the tube passing through said plate B′; but the intermediate plate B′ and tube E may be stamped up in a single piece.

It will be observed, by reference to Fig. 2, that the air enters through the perforations in the base-plate B, then passes down through perforations in the plate B′, and then up the tube, its velocity being thereby broken, so as to insure a steadier light.

The lower end of the body A is cut out, so as to leave a free communication through the filler-tube into the lamp. It will, therefore, be observed that this filler-tube E serves as a means for replenishing the lamp with oil without removing the burner.

The disk F is perforated with numerous fine holes, and surrounds the upper end of the wick-tube, and I have shown this disk as connected to the tubular filler in a very simple manner—for instance, it is provided with a short rod, *c*, which passes through a hole made in the filler-tube, its end being bent or headed so as to prevent the disk becoming readily detached, and at the same time so as to permit the disk being swung round to uncover the mouth of the filler-tube sufficiently for refilling the lamp, the disk resting on a ledge or shoulder provided for it on the filler-tube. This disk becomes an air-distributer and a safety-plate for preventing the flame passing down into the lamp, or following any escaping gas down into the lamp, and thereby causing an explosion, it being well-known that fire will not pass through fine perforations in a metal plate, unless the plate becomes heated to a high degree, and this latter is prevented, in the present instance, by the air which passes up through the perforations to the flame cooling said plate.

It is desirable to attach this air-distributer or safety-plate in such way that it cannot inadvertently be left off; and, by noticing the arrangement of the parts as shown in Fig. 3, it will be observed that the parts cannot be positioned for use without the replacement of the safety-plate after a replenishment of the lamp.

This perforated disk may be placed farther down in the filler-tube, and be either stationary or movable. I prefer to locate it just below the upper end of the wick-tube.

G designates the cone, and this is attached by a hinge, *d*, on one side, and a tongue, *e*, entering a slot, *f*, on the other side for locking it in place. This removable cone enables the upper end of the wick-tube to be exposed for trimming the wick accurately and readily, which cannot be well done with an ordinary burner adapted for carrying the sun-burner chimney, as in the latter case the wick needs to be run up above the deflector, where there is no edge to cut against.

I am aware that lamp-burners have been provided with filler-tubes and with tubes for permitting the escape of any gas generated in the lamp; but I know of none combined with the burner, or constructed in such manner that the filler-tube shall answer a twofold purpose—that of a filler for conducting oil into the lamp for replenishing the same, and that of a conductor for causing the air to pass up along and close to the wick-tube in its travel to the flame, thereby keeping the wick-tube cool, and supplying the flame with air, which, in passing through the perforated plates B and B′, is deprived of any current or velocity which might affect the flame, and hence many advantages are gained.

I claim as my invention—

1. The combination, in a lamp, of the following devices: An elevated air-distributer, F, near the upper end of the wick-tube, a flange, *t*, around the air-distributing plate, adapted to extend to the interior, or nearly so, of the chimney, a chimney-holder below the said flange, a removable cone or deflector, G, and a hinge, *d*, for connecting said deflector to the portion of the burner surrounding the perforated plate F, substantially as set forth.

2. The tube E, surrounding the wick-tube, and extending below the flange *t*, in combination with the removable air-distributer F, perforated plates B and B′, and open body A, as and for the purposes set forth.

Signed by me this 13th day of April, A. D. 1874.

SAML. W. FOWLER.

Witnesses:
ORVILLE D. LOVELL,
CHAS. H. SMITH.